United States Patent Office 3,594,434
Patented July 20, 1971

3,594,434
PROCESS FOR THE CATALYTIC PREPARATION OF DIVINYLCYCLOBUTANE
Gunther Wilke and Paul Heimbach, Mulheim (Ruhr), and Wolf-Bernd Brenner, Oberhausen, Rhineland, Germany, assignors to Studiengesellschaft Kohle m.b.H., Mulheim (Ruhr), Germany
No Drawing. Filed Apr. 3, 1968, Ser. No. 718,376
Claims priority, application Germany, Apr. 8, 1967, St 26,718
Int. Cl. C07c 3/10
U.S. Cl. 260—666        4 Claims

ABSTRACT OF THE DISCLOSURE

A process for the catalytic dimerisation of 1,3-diolefines is disclosed. Preferred diolefines are butadiene, isoprene and piperylene. The catalysts used are ones formed by mixing a reducible nickel compound and a metal having a reducing action with respect to the reducible nickel compound or a halogen-free organometallic compound, of which metal alkyls, metal aryls or metal hydrides are examples, and an electron donor. They may also be formed by mixing a nickel complex compound which contains O-valent nickel with an electron donor. The electron donor may be an ester of a phosphorous acid or a diolefine. The process is carried out with incomplete conversion of the 1,3-diolefine.

---

This invention relates to a process for the catalytic preparation of divinyl cyclobutane.

German patent specification 1,140,569 describes a process for the catalytic dimerisation or trimerisation of 1,3-diolefines with the aid of catalysts of mixtures of carbon monoxide-free compounds of nickel and halogen-free organometallic compounds such as metal alkyls, aryls or hydrides and electron donors. Similar processes are claimed in German Auslegeschrifts 1,126,864 (the catalysts are here produced by reduction of transition metal compounds with the aid of metals such as Al and Hg) and 1,144,268 (certain nickel-(O)-compounds are used as catalysts). Futhermore, it is known, in accordance with the processes described in German patent specification 881,511 and the process described in U.S. patent specification 2,686,209, that butadiene can be converted with the aid of catalysts such as $(R_3P)_2Ni(CO)_2$ and $[(RO)_3P]_2Ni(CO)_2$ into mixtures of cyclooctadi-1,5-ene and 4-vinyl cyclohexene. According to Austrian patent specification 232,495, the catalytic mixed oligomerisation of, for example, butadiene and ethylene, leads to the formation of cyclodecadi-1,5-ene and decatri-1,4,9-ene, respectively. According to all the processes described in the aforementioned patents, substituted 1,3-diolefines can be used instead of butadi-1,3-ene.

It has now surprisingly been found that the catalyst systems disclosed in the aforementioned patent specifications, when using nickel complex compounds, transform the 1,3-diolefines into eight-ring or twelve-ring compounds, or by addition of monosubstituted and disubstituted olefines and acetylenes, into ten-ring compounds, and with incomplete conversion of the 1,3-diolefine, are able to form in good yields four-ring compounds of the type of cis-1,2-divinylcyclobutane.

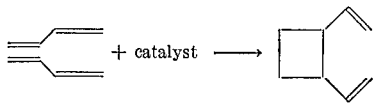

According to the invention, butadiene and/or substituted butadienes are used. The substituents can optionally themselves be functional groups, e.g. alkoxy groups, or even contain such functional groups. As functional groups, only those are to be considered which do not enter into any side reactions with the catalysts in the presence of excess 1,3-diolefine.

The process according to the invention for the catalytic dimerisation of 1,3-diolefines, such as isoprene, piperylene and/or advantageously butadiene, into divinylcyclobutane or substituted divinylcyclobutanes, is therefore characterised in that catalysts which are formed either by mixing a reducible nickel compound and a metal having a reducing action with respect to the reducible nickel compound, or halogen-free organometallic compound such as metal alkyls, metal aryls or metal hydrides and an electron donor, or by mixing a nickel complex compound which contains O-valent nickel, with electron donors, advantageously esters of phosphorus acid or diolefines, are made to act on 1,3-diolefines with incomplete conversion of the 1,3-diolefine.

The process according to the invention can be carried out in the presence of inert solvents, i.e. in the presence of those solvents which attack neither the catalysts nor the organometallic components or the metal hydrides which are used for the preparation of the catalysts. Aliphatic or aromatic hydrocarbons, aliphatic or cycloaliphatic ethers and halogenated hydrocarbons are preferably used. The diolefines used as starting material or the products which are produced according to the process may be used with advantage as solvents and at the same time as electron donors, at the time of producing the catalyst. The process can be carried out under normal pressure or under superatmospheric pressure and at temperatures from −10 to +150° C., advantageously at 20 to 100° C.

In accordance with the process of the invention, it is advantageous to employ temperatures below 100° C., since divinylcyclobutane, as is known, from E. Vogel, Liebigs Ann. Chem. 615, on page 1, is transformed by heat into cyclooctadiene (violent reaction at 120° C.), unless the residence time at temperatures above 100° C. is very short. It is however of prime importance in accordance with the process of the present invention to keep the conversion of the 1,3-diolefine as far as possible below 95%. As the concentrations of the still unreacted 1,3-diolefine become smaller, there is observed to an increased degree a catalytic rearrangement of, for example, cis-divinylcyclobutane into cyclooctadi-1,5-ene and 4-vinylcyclohexene, which takes place at substantially lower temperatures than that of the thermal re-arrangement (120°). According to the invention, when working up a reaction mixture, the catalyst is either destroyed while still in the presence of unreacted 1,3-diolefine or the reaction product is separated from the catalyst as quickly as possible, e.g. by the use of a thin-film evaporator. The latter method is particularly suitable if the nickel catalyst is to be used several times.

Divinylcyclobutanes are highly active diolefines and are easy to incorporate by polymerization as third component during the copolymerization of olefines. On account of the ease with which the divinylcyclobutanes are prepared by the present process, these products constitute valuable monomers for copolymerization. The following examples illustrate the invention:

EXAMPLE 1

4.38 g. of nickel acetylacetonate (17.05 mmol) are reduced with 4.5 g. of diethyl aluminum monoethoxyl (34.6 mmol), in the presence of 9.18 g. of tri-(ortho-penyl-phenyl)-phosphate (17.05 mmol), 50 ml. of cyclooctadi-1,5-ene and 10 ml. of liquid butadiene. The catalyst solution is introduced together with 578 g. of liquid butadiene into a 1.8-litre glass autoclave. After 3 days at 20° C., the catalyst is destroyed with hydrochloric acid and air, the reaction solution is washed neutral and dried. After extraction of the cyclooctadi-1,5-ene used as solvent, there are obtained 462 g. of a product with the following composition (gas chromatography):

9.2 g.=2.0% of 4-vinylcyclohexene
288.0 g.=62.3% of cyclooctadi-1,5-ene
163.3 g.=35.4% of cis-divinylcyclobutane
1.4 g.=0.3% of higher oligomers.

The yield of cis-divinylcyclobutane amounts to 35% with an 80% conversion of the butadiene. The cis-divinylcyclobutane is preferably distilled in a low-temperature column (BP$_{10}$=9° C., $n_D^{20}$=1.4562).

EXAMPLE 2

The catalyst and procedure is as in Example 1, but the reaction was stopped at different conversions of the butadiene. The yields, based on the percentage conversion of the butadiene, are set out below:

Cis-divinylcyclobutane, percent—
29–35
55–35
88–35
95–14
100–0

EXAMPLE 3

Procedure as in Example 1. As catalyst, 4.67 g. (17.05 mmol) of Ni-(cyclooctadi-1,5-ene)$_2$ and 9.18 g. (17.05 mmol) or tri-(orthophenyl-phenyl)phosphite in toluene were dissolved in cyclooctadi-1,5-ene. With 80% conversion of the butadiene, the reaction velocities and the yields correspond to the values of Example 1.

EXAMPLE 4

Procedure and catalyst as in Example 1. 300 g. of butadiene are used. Reaction temperature 40° C. After 7 hours and a conversion of 66% of the butadiene and the usual working up, there are obtained 198.5 g. of a product having the following composition:

3.0 g.=1.5% of 4-vinylcyclohexene
123.5 g.=62.2% of cyclooctadi-1,5-ene
71.7 g.=36.1% of cis-dinvinylcyclobutane
0.3 g.=0.2% of higher oligomers.

EXAMPLE 5

Procedure and catalyst (half quantity) as in Example 1. Reaction temperature 60° C. After 1 hour and 26% conversion of the butadiene, there are obtained 83.4 g. of a product with the following composition:

1.6 g.=1.9% of 4-vinylcyclohexene
51.8 g.=62.1% of cyclooctadi-1,5-ene
30.0 g.=35.9% of cis-divinylcyclobutane.

EXAMPLE 6

Procedure and catalyst as in Example 1. Triphenyl phosphine is used instead of tri-(orthophenyl-phenyl)-phosphite, and only 100 ml. of liquid butadiene are used. After 6 days and with an 80% conversion of the butadiene at a reaction temperature of 20° C., there are obtained 51.1 g. of a product with the following composition:

13.9 g.=27.2% of 4-vinylcyclohexene
17.9 g.=35.0% of cyclooctadi-1,5-ene
19.0 g.=37.2% of cis-divinylcyclobutane
0.3 g.=0.6% of higher oligomers.

EXAMPLE 7

Procedure and catalyst as in Example 1. 100 ml. of liquid butadiene are introduced and tricyclohexyl phosphine is added instead of tri-(orthophenyl-phenyl)-phosphite. After 10 days, with a conversion of 60% of the butadiene, there are obtained 38.4 g. of a product with the following composition:

11.9 g.=31.0% 4-vinylcyclohexene
14.1 g.=36.7% cyclooctadi-1,5-ene
10.1 g.=26.3% cis-divinylcyclobutane
2.3 g.=6.0% higher oligomers

EXAMPLE 8

Procedure and catalyst as in Example 1. The reaction product is however separated to the extent of 90–95% from the catalyst by means of a thin-film evaporator. This contains all the cis-divinylcyclobutane which is formed. In this way, the same catalyst could be used three times with equal success. The yields of cis-divinylcyclobutane, based on the butadiene used, are:

In the first throughput: 36%
In the second throughput: 38%
In the third throughput: 38%

EXAMPLE 9

13.15 g. (51.2 mmol) of nickel acetylacetonate and 27.5 g. (51.2 mmol) of tri-(orthophenyl-phenyl)-phosphite are suspended in 425 g. (500 ml.) of piperylene and, after reduction of the nickel with 13.3 g. 102.4 mmol), of diethyl aluminium ethoxyl (formation of an orange-reddish solution), left to stand for 9 days at 20° C. After working up in the usual manner as in Example 1, there are obtained 224.1 g. of a product (=53% conversion of the piperylene) with the following composition (capillary chromatography):

34.9 g.=15.6% of dimethyl-cis-divinylcyclobutanes
8.2 g.=3.7% of dimethyl-4-vinylcyclohexene
177.9 g.=79.3% of dimethyl-cyclooctadi-1,5-ene (4 isomers)
3.1 g.=1.4% of higher oligomers The dimethyl-cis-divinylcyclobutane fraction could be separated into two substances, either by gas chromatography or by distillation in the rotating band column in vacuo, one of the substances being the said 1,2-cis-divinyl-3,4-dimethylcyclobutane (B.p.$_{11}$ mm.=42° C.—$n_D^{20}$=1.4778)

and the other being the 1-propenyl-2-vinyl-3-methylcyclobutane (B.p.$_{11}$ mm.=46° C.—$n_D^{20}$=1.4552).

EXAMPLE 10

Procedure and catalyst as in Example 1, reaction temperature 40° C. Instead of pure butadiene, however, a mixture of butadiene and 2-butine in the molar ratio of 5:1 are used. After 8 hours, the reaction is stopped and working up takes place as indicated in Example 1. After extraction of the cyclooctadi-1,5-ene used as solvent, there are obtained 300 g. of a product with the following composition:

26.2 g.=8.7% cis-divinylcyclobutane
4.1 g.=1.4% 4-vinylcyclohexene
200.2 g.=66.7% cyclooctadi-1,5-ene
59.3 g.=19.8% dimethylcyclodecatriene
0.8 g.=0.1% cyclododecatri-1,5,9-ene
9.4 g.=3.1% higher oligomers
93% conversion of butadiene and 45% conversion of 2-butine.

EXAMPLE 11

Catalyst as in Example 1. The catalyst solution is mixed with 1 kg. of butadiene in a storage vessel at 0° C. and pumped at 20 atm. through a capillary (300 cc. content) heated to 80° C. (residence time 30 minutes). After releasing the pressure, the nickel catalyst is immediately destroyed by an aqueous 2 N-hydrochloric acid and air. After working up and extracting the cyclooctadi-1,5-ene used as solvent, there are obtained 580.1 g. of a product having the following composition:

186.2 g.=32.1% cis-divinylcyclobutane
15.7 g.=2.7% 4-vinylcyclohexene
376.0 g.=64.8% cyclooctadi-1,5-ene
2.2 g.=0.4% higher oligomers.

EXAMPLE 12

Procedure and catalyst as in Example 11. After releasing the pressure, the catalyst is however not destroyed, but is directly separated by means of a stripper from the product, except for about 5%. The residual catalyst solution can be used again. With a conversion of butadiene of 60%, the yield of cis-divinylcyclobutane in the distillate is about 35%, related to the butadiene which is used.

We claim:
1. In the process for producing a 1,2-cis-divinylcyclobutane catalytic dimerization of 1,3-diolefines which comprises contacting said 1,3-diolefin with a catalyst selected from the group consisting of:
   (A) the complex reaction product of:
      (1) a reducible nickel compound,
      (2) a reducing agent selected from the group consisting of a metal having a reducing action with respect to said reducible nickel compound and a halogen-free organo-metallic compound selected from the group consisting of metal alkyls, metal aryls and metal hydrides, and
      (3) an electron donor; and
   (B) the complex reaction product of:
      (1) a zero valent nickel-containing complex compound, and
      (2) an electron donor;
the improvement whereby increasing the yield of 1,2-cis-divinylcyclobutane product which comprises carrying out said dimerization at a temperature of 20 to 100° C. to an incomplete conversion of below 95%.

2. A process as claimed in claim 1 in which the electron donor is an ester of phosphorous acid or a diolefine.

3. The improved process claimed in claim 1, wherein said 1,3-diolefin is a member selected from the group consisting of butadiene, isoprene and piperylene.

4. The improved process claimed in claim 1, wherein said reducing agent is monoethoxy, diethyl aluminum.

References Cited

UNITED STATES PATENTS

| | | | |
|---|---|---|---|
| 3,201,484 | 8/1965 | Myers | 260—666B |
| 3,238,265 | 3/1966 | Mueller | 260—666B |
| 3,271,468 | 9/1966 | Wilke | 260—666B |
| 3,284,520 | 11/1966 | Zuech | 260—666B |
| 3,453,197 | 7/1969 | Trecker | 260—666 |

DELBERT E. GANTZ, Primary Examiner

V. O'KEEFE, Assistant Examiner